US006135292A

United States Patent [19]

Pettner

[11] Patent Number: 6,135,292

[45] Date of Patent: Oct. 24, 2000

[54] METHOD AND SYSTEM FOR PRESORTING MAIL BASED ON MAIL PIECE THICKNESS

[75] Inventor: Gabriel E. Pettner, Orange, Conn.

[73] Assignee: Pitney Bowes Inc., Stamford, Conn.

[21] Appl. No.: 09/217,737

[22] Filed: Dec. 21, 1998

[51] Int. Cl.[7] .................................. B07C 5/12; G06F 7/00

[52] U.S. Cl. .......................... 209/603; 209/900; 700/223; 271/263

[58] Field of Search .................................... 209/601, 603, 209/604, 584, 900; 700/223, 219; 271/258, 262, 263

[56] References Cited

U.S. PATENT DOCUMENTS

| | | | |
|---|---|---|---|
| 5,005,124 | 4/1991 | Connell | 364/401 |
| 5,008,827 | 4/1991 | Sansone | 364/464.02 |
| 5,051,914 | 9/1991 | Sansone | 364/478 |
| 5,079,714 | 1/1992 | Mandyley et al. | 700/219 |
| 5,142,482 | 8/1992 | Sansone | 700/221 |
| 5,475,603 | 12/1995 | Korowotny | 364/478 |
| 5,704,246 | 1/1998 | Kruger | 209/900 X |

FOREIGN PATENT DOCUMENTS

| | | | |
|---|---|---|---|
| 225288 | 6/1987 | European Pat. Off. | 209/604 |

*Primary Examiner*—Tuan N. Nguyen
*Attorney, Agent, or Firm*—Kimberly S. Chotkowski; Michael E. Melton

[57] ABSTRACT

The present invention relates to a method and system for accurately measuring mail piece thickness for the purpose of determining postage discount qualification of a mail piece to be placed in a mail tray for receiving the maximum postage discount. The system includes a device for measuring the thickness of said mail piece and a user interface for entering data representing at least one postal address and the measured mail piece thickness. The system further includes a data processing system for processing the mail piece in accordance with the set of address data and the mail piece thickness, to produce a set of mail piece data. The data processing system is coupled to the thickness measuring device and the user interface and includes a memory for storing the sets of data. The system further sorts the sets of mail piece database upon postal guidelines such that qualification of a mail piece can be determined. Output is provided for displaying the resulting mail piece identifier.

25 Claims, 3 Drawing Sheets

METHOD AND SYSTEM FOR PRESORTING MAIL BASED ON MAIL PIECE THICKNESS

FIELD OF THE INVENTION

The invention disclosed herein relates generally to article processing and delivery, and to improvements in mail processing systems which will relieve official postal facilities of certain mail handling tasks and enable mail pieces to qualify for certain postal discounts. Specifically, this invention relates to processing and discounts related to the thickness of a mail piece.

BACKGROUND OF THE INVENTION

The United States currently has the world's largest postal system, which handles billions of pieces of mail each year. The servicing of mail delivery involves three general steps: collection, sorting, and delivery. Collection takes place through a series of post office facilities spread throughout the United States. Postal employees typically take mail pieces from the mailboxes to the nearest local office where the mail pieces are accumulated for the sorting procedure. At the post office, postal clerks segregate mail by size and class into separate categories. The mail is then sent from local post offices to central facilities known as sectional centers. At the sectional centers, high speed automated equipment sorts large volumes of mail.

During sortation, a zip mail translator sorts the postmarked letters according to their destination post office. Postal workers sort the mail by region and then send each letter to one of several bins. Each bin contains the mail of a predetermined postal destination. The mail is then transported to the destination specified by each bin. At the local offices the mail is again sorted for the area served by the local office into bundles for each delivery route.

Cost of maintaining and supporting sorting services at the central post office facilities, even with the implementation of automated equipment, has become staggering. It has been projected that the volume of mail passing through the central post office facilities will increase, and accordingly, the associated sorting service fees will also increase.

Rapidly advancing postal rates place increased burdens on both the user and the postal service required to support such volumes of mail. In order to prompt customers to assist the postal service with their enormous task, the postal service has offered discounts in rates to high volume users, providing the users comply with certain requirements. These requirements have been instituted in an effort to improve efficiency and reduce processing time required of the central facilities.

Postal discounts are allocated for several aspects of mail piece work sharing. The requirements the user must comply with in order to qualify for the postal discounts are set forth by the United States Postal Service's Domestic Mail Manual. Such discounts are provided to users who presort their mail for easy processing by the postal authority.

In order for the user to gain the benefit of the work sharing process and qualify for postal discounts without significantly increasing their workload, postal mail processing programs have been created. Postal discounts are provided for example, for sorting mail based on the address information such as the mail piece zip code and the like.

Systems relating to work sharing features are discussed in U.S. Pat. No. 5,051,914 to Sansone et al. (hereinafter referred to as "SANSONE 1") for Optimizing Mail Delivery Systems by Merging Mailings, U.S. Pat. No. 5,008,827 to Sansone et al. (hereinafter referred to as "SANSONE 2") for a Central Postage Data Communications Network and U.S. Pat. No. 5,005,124 to Connell et al. (hereinafter referred to as "CONNELL") for Method and Apparatus for Categorizing and Certifying Mail. These patents relate to the concept of certain limited user services and data sharing, but do not encompass the full range of work sharing. For example, SANSONE 1 discloses a system for optimizing mail delivery of a batch of mail by interconnecting a plurality of batch mailers and enabling the merging of mail batches to achieve postal discounts. SANSONE 2 discloses a communications system for work sharing between participants, as well as self-contained automated processing facilities relative to specific postal service requirements for postal discounts. CONNELL discloses an apparatus and method for categorizing and certifying mail to allow the postal service to eliminate its manual acceptance procedures, thus reducing postal service employee workload.

Another prior art system, in which postal discounts are provided based upon the work-sharing concept, is disclosed in U.S. Pat. No. 5,475,603 to Korowotny for an Apparatus and Method for Mail Qualification and Traying. This invention describes providing dual sliding windows for the purpose of determining postage discount qualifications across invalid and unreadable mail pieces and determining the number of mail pieces to be placed in a mail tray, for receiving the maximum postage discount as based upon mail piece weight.

The above mentioned prior art systems do not use an accurate mail piece measurement to be included as a parameter in a presort program in determining the number of mail pieces to be included in a mail tray for receiving maximum postage discounts.

Typical prior art mail processing systems include: a data base management system; an address cleansing system; a presort program; and, an output system. The data base system includes information that describes the address corresponding to the mail piece. Address cleansing is well known in the art of mail processing and thus, a detail description is not necessary for an understanding of the present invention.

Presort programs generally sort mail based on a set of parameters determined by the user. Presort is accomplished prior to delivering the mail piece to the post office. The presort parameters include, but are not limited to, the size of the mail piece, the class of the mail piece, the type of mail being delivered, and the payment method for the mail piece. Another such postal discount is provided for mail pieces that have been sorted into postal trays according to the thickness of the mail piece.

In prior art systems, the user determines the thickness of a mail piece by manually measuring one piece of mail and entering that measurement into a mail processing system. Inaccuracies due to human error during the manual measurement of the mail pieces have been a common problem with these prior art systems. The inaccuracies of mail piece measurement often result in air trays and/or over-filled trays. Air trays are trays that do not meet the requirement of "filled" as set forth in the Domestic Mail Manual, and thus, do not qualify for postal discounts. Overfilled trays are trays that are filled above capacity, thus unjustly qualifying a mail piece for postal discounts. In these situations, either the user does not receive the benefit of their work sharing efforts, or the post office does not receive the proper postal payment. As well, these inaccuracies require both the user and the post office to expend significant time and money correcting the results of the measurement errors.

In order to comply with the requirements set forth in the Domestic Mail Manual of the Postal Service the user is left with a high burden. Therefore, the customer's internal sorting process, specifically, the mail piece thickness measurement, must be executed in a manner that will permit the user to realize substantial savings in response to the increase in workload.

SUMMARY OF THE INVENTION

Therefore, it is an object of this invention to provide a method and a system for accurately determining the thickness of a mail piece. It is a further object of this invention to provide a method and system that will qualify the mail piece for postal discounts. It is yet a further object of this invention to reduce the time and cost associated with correcting the problems associated with postal service work sharing due to inaccurate mail piece thickness measurements.

The present invention provides a method for qualifying mail pieces for postal discounts within a mail piece processing system. The method includes creating a database within system for containing mail piece address data. Postal code parameters are then entered into the system for defining mail piece address data. The process of postal coding corrects city names and standardize state abbreviations and assigns Zip, Zip+4, carrier route and delivery point codes. A detailed description of postal coding is not necessary for an understanding of this invention.

In the preferred embodiment of the present invention, a presort program is selected in the mail piece processing system. The presort program defines a set of presort mail piece characteristics, such as: mail piece type; mail piece class; mail piece payment; container type; and, the accurate mail piece thickness. It is to be appreciated that other parameters may be included in the presort program. In the preferred embodiment, the thickness of the mail piece is measured through a thickness-measuring device. The measurement may be digitally taken. The measurement may also be automatically entered into the presort program.

Postal discounts are then determined for the mail piece based upon the data base, the postal coding, the selected presort mail piece characteristics and the mail piece measurement such that the postal trays are filled based upon the calculated number of mail pieces that will maximize postal discounts in accordance with the Domestic Mail Manual or similar postal system requirement. A mail piece identifier is created based upon the postal discounts as determined by the presort program. The mail piece identifier is provided to the user through an output means. The output means may be a monitor, a mail piece identifier created by a printer, or the like. The mail piece identifier may be an address label, a container label, or a report.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
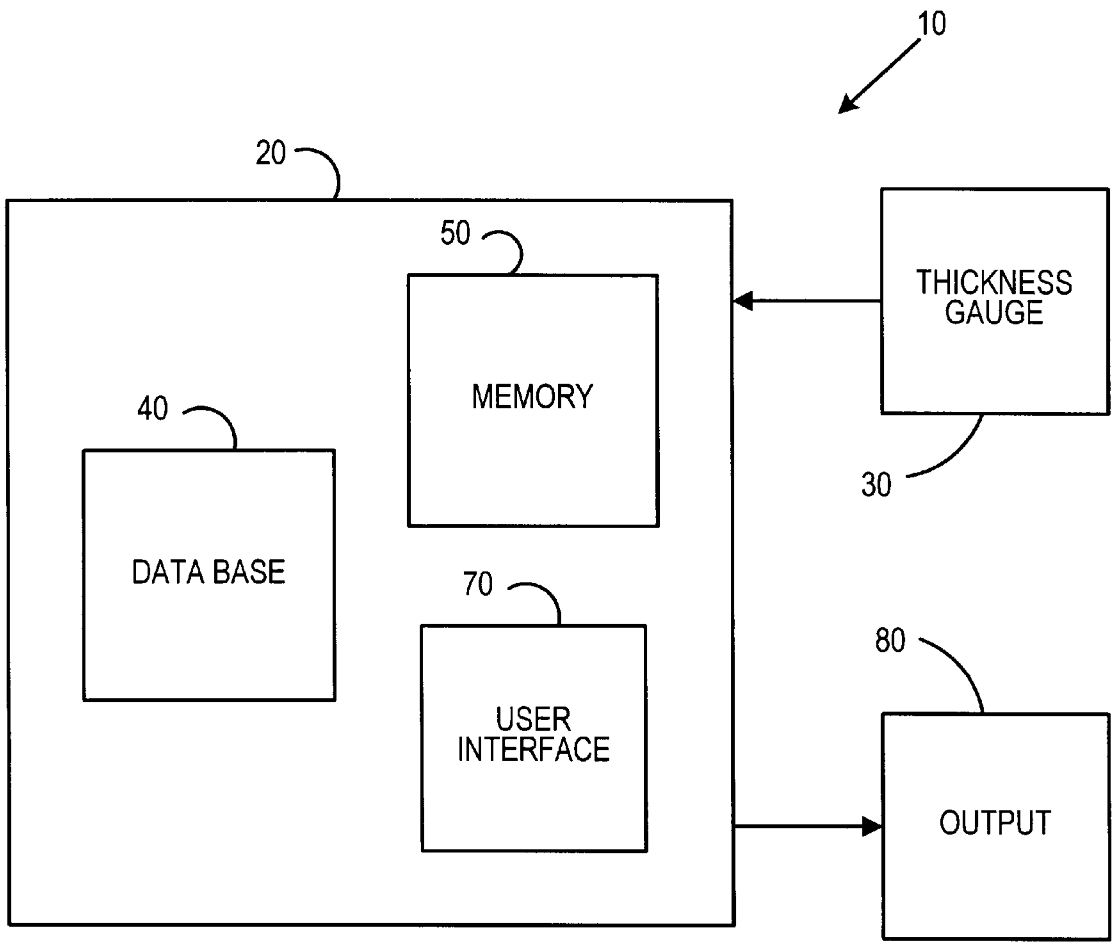
FIG. 1 is a block diagram of the system of the present invention.

In describing the present invention, reference is made to the drawings, wherein there is seen in FIG. 1 a block diagram of the system of the present invention. A mail processing system 10 is shown in which the instant invention can be practiced. Mail processing system 10 includes thickness gauge 30, output 80 and user interface 70 operatively connected to data processing system 20. Thickness gauge 30 may be a digital micrometer. Digital micrometers are well known in the art and therefore a detailed description is not necessary for an understanding of this invention. User interface 70 may be a touch screen, a keyboard or similar data input device. Output 80 may be a printer, a monitor or similar display device. Data processing system 20 further includes database 40 and memory 50 for storing information contained in the data processing system. Database 40 includes address data, rate data and other mail processing data. Presort program is Presort programs based on the entered parameters sorts the data base addresses records the sorting into groups of prices or packages and then further groups the package into trays. This sorting and grouping is performed in accordance with postal guidelines.

Figure 2:
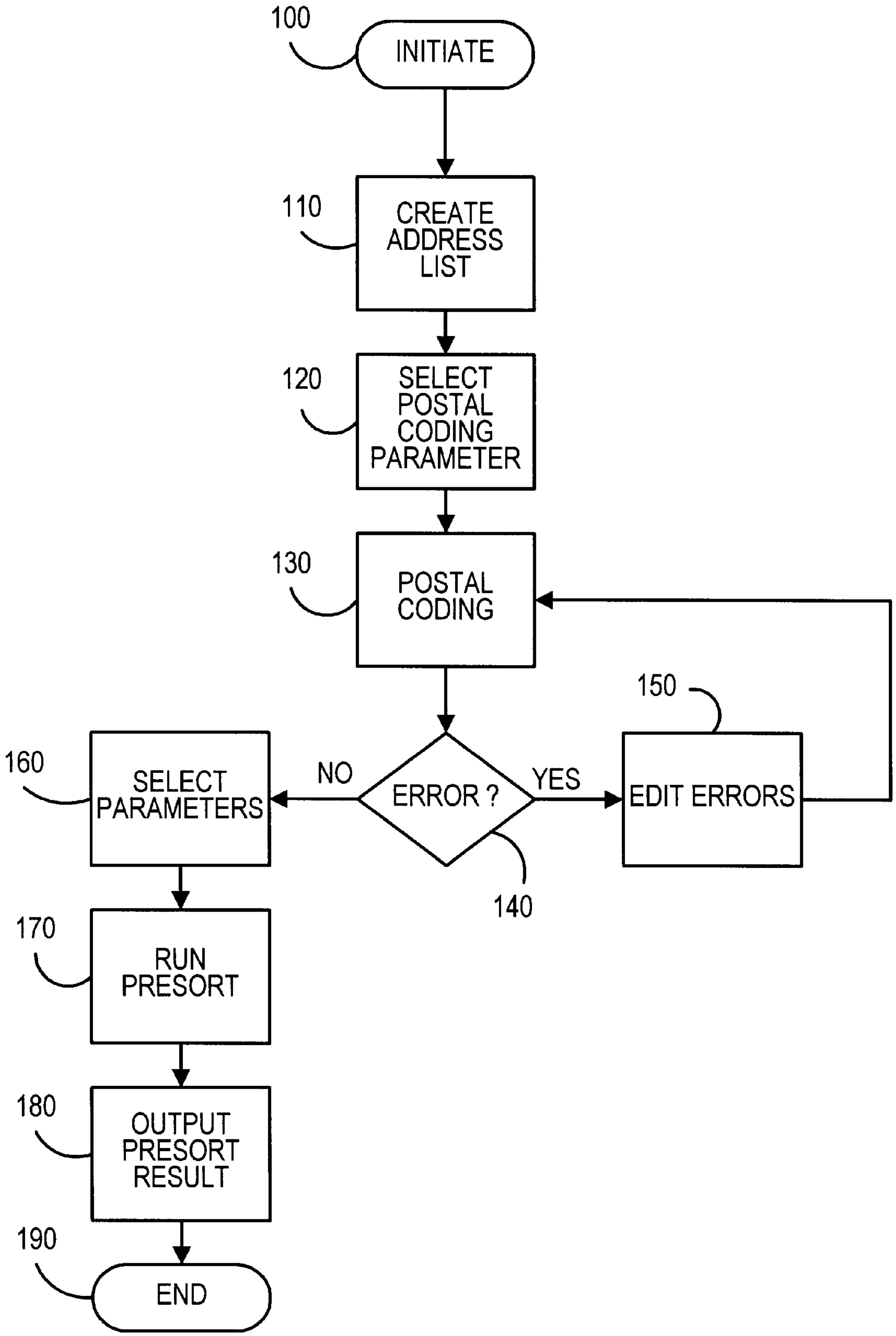
FIG. 2 is a flow chart depicting the operations of the overall system of the present invention.

Now turning to FIG. 2, a flow chart is shown that represents the overall method for carrying out the instant invention. The process is begun at step 100 where the mail processing system is initiated. Thereafter at step 110 the user is prompted to create an address list. The address list is created within data processing system 20. It is to be appreciated that at step 110 the user may choose to edit an existing list. The method continues to step 120 where the user is prompted to select postal coding parameters. Postal coding parameters include identifying zip code, zip+4 code, carrier route and delivery point code fields. Postal coding and postal code parameters are known in the art of mail processing and thus, a detailed description of postal coding and these parameters is not necessary to an understanding of this invention.

The method continues at step 130 were postal coding is performed. Postal coding may also be referred to as address hygiene or address cleansing. One example of address cleansing is the detection and correction of incorrectly spelt city names. The main purpose of postal coding is to assign an eleven-digit postal code representative of the zip, zip+4 and the delivery point. The method proceeds to step 140 where the method inquires whether a postal code could be assigned to a record. If at step 140 a postal code could not be assigned to a record the method continues to step 150 where the errors are edited. If however, at step 140 no error is detected, the method proceeds to step 160 where the presort program is run. The presort program will be described further in FIG. 3. The method continues to step 170 which displays an output of the presort program result at step 180. The method ends at step 190.

Figure 3:
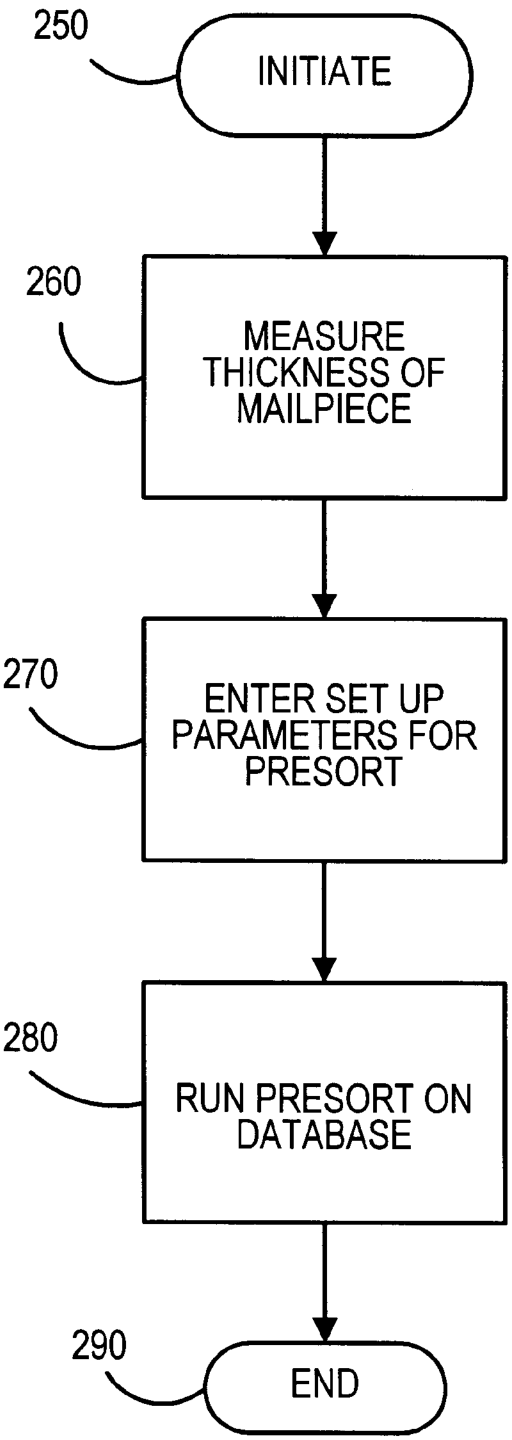
FIG. 3 is a flow chart depicting the operation of the present invention.

Now turning to FIG. 3, a flow chart is shown representing the presort program. The presort program is initiated at step 250 and continues at step 260 where the thickness of a mail piece is measured. The method then progress to step 270 where the presort parameters for presort are selected. Presort parameters may include variables such as the mail piece class either first class, mail type, standard or nonprofit. Also included, is designation of the type of mail being sent as either a letter, a card or a flat. The parameters may further include the payment method of the mail piece such as postage meter, permit imprint, pre-cancelled or stamp. Another presort parameter may be the type of container to be delivered to the post office such as a tray, a flat tray or a sack.

After the presort parameters have been selected at step 270. The method then progresses to step 280 where the presort program is run and the mail pieces are sorted according to the entered parameters.

While the present invention has been disclosed and described with reference to a single embodiment thereof, it will be apparent, as noted above that variations and modifications may be made therein. It is also noted that the present invention is independent of the machine being controlled, and is not limited to the control of inserting machines. It is thus intended in the following claims to cover each variation and modification that falls within the true spirit and scope of the present invention.

What is claimed is:

1. A system for pre-certification measuring of mail piece postal discount qualifications, the system comprising:

a) a thickness measuring device for accurately measuring the thickness of said mail piece;

b) a user interface for entering a set of data indicative of at least one postal address and said accurately measured mail piece thickness;

c) a data processing system for processing said mail piece in accordance with said set of address data and said accurately measured mail piece thickness to produce a set of mail piece data, said data processing system coupled to said thickness measuring device and said user interface, said data processing system including a memory for storing one or more sets of data;

d) a means for sorting said one or more sets of mail piece data whereby said mail piece will be pre-certified for qualified postal discounts; and e) an output means coupled to said data processing system for outputting a mail piece identifier.

2. The system of claim 1 wherein said set of mail piece data includes a mail piece classification.

3. The system of claim 1 wherein said set of mail piece data includes postal rate guidelines.

4. The system of claim 1 wherein said set of data includes a mail piece weight measurement.

5. The system of claim 1 wherein said data processing system further includes a weight bearing scale.

6. The system of claim 1 wherein said output means is a printer.

7. The system of claim 1 wherein said mail piece identifier is an address label.

8. The system of claim 1 wherein said mail piece identifier is a container label.

9. The system of claim 1 wherein said mail piece identifier is a report.

10. The system of claim 1 wherein said mail piece thickness measurement is a digital measurement.

11. The system of claim 1 wherein said mail piece thickness measurement is automatically entered into said data processing system.

12. A method for pre-certifying qualifications of mail pieces for postal discounts within a mail piece processing system said method comprising the steps of:

a) creating a database in said mail piece processing system for containing mail piece address data;

b) selecting postal code parameters in said mail piece processing system for defining mail piece address data;

c) performing address cleansing based upon said postal code parameters for cleansing said mail piece address data;

d) selecting a presort program in said mail piece processing system for defining a set of presort mail piece characteristics; defining said mail piece characteristics further comprising the steps of;

i. selecting a presort mail piece characteristics;

ii. accurately measuring the thickness of a mail piece;

iii. entering said mail piece thickness into said presort program;

e) sorting said mail pieces for postal discount qualifications based upon said presort program, said postal coding and said selected presort mail piece characteristics; and f) creating a mail piece identifier based upon said postal discount determination; and g) printing an output of said mail piece identifier.

13. The method of claim 12 wherein said thickness of said mail piece is measured digitally.

14. The method of claim 12 wherein said thickness measurement is automatically entered into said presort program.

15. The method of claim 12 wherein said presort mail piece characteristics include a container type.

16. The system of claim 12 wherein said mail piece identifier is an address label.

17. The system of claim 12 wherein said mail piece identifier is a container label.

18. The system of claim 12 wherein said mail piece identifier is a report.

19. A mail piece pre-qualification system for qualifying one or more mail pieces for postal discounts, said system comprising;

a) a mail processing machine; said mail processing machine further comprising;

(i) a data base management system;

(ii) an address cleansing system;

(iii) a presort program; and (iv) a printing means for printing mail piece data;

b) a mail piece thickness measurement device for accurately measuring the thickness of a mail piece, said mail piece measurement thickness device directly coupled to said presort program;

(c) a means for sorting said one or more mail pieces based upon said accurate mail piece thickness measurement and postal service guidelines, such that said one or more mail pieces qualifies for a postage payment discount.

20. The system of claim 19 wherein said output means is a printer.

21. The system of claim 19 wherein said mail piece identifier is an address label.

22. The system of claim 19 wherein said mail piece identifier is a container label.

23. The system of claim 19 wherein said mail piece identifier is a report.

24. The system of claim 19 wherein said output means is a monitor.

25. The system of claim 19 wherein said one or more mail piece categorization further includes said presort characteristics.

* * * * *